(12) United States Patent
Kakishima et al.

(10) Patent No.: US 11,515,923 B2
(45) Date of Patent: Nov. 29, 2022

(54) USER EQUIPMENT AND RADIO COMMUNICATION METHOD

(71) Applicant: NTT DOCOMO, INC., Tokyo (JP)

(72) Inventors: Yuichi Kakishima, Tokyo (JP); Yuki Matsumura, Tokyo (JP); Ryosuke Osawa, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/266,825

(22) PCT Filed: Aug. 9, 2018

(86) PCT No.: PCT/JP2018/030000
§ 371 (c)(1),
(2) Date: Feb. 8, 2021

(87) PCT Pub. No.: WO2020/031356
PCT Pub. Date: Feb. 13, 2020

(65) Prior Publication Data
US 2021/0351829 A1 Nov. 11, 2021

(51) Int. Cl.
*H04B 7/06* (2006.01)
*H04B 7/0404* (2017.01)
(Continued)

(52) U.S. Cl.
CPC ......... *H04B 7/0686* (2013.01); *H04B 7/0404* (2013.01); *H04B 7/0456* (2013.01); *H04W 16/28* (2013.01)

(58) Field of Classification Search
CPC .......... H04B 7/00; H04B 7/04; H04B 7/0404; H04B 7/0408; H04B 7/0413;
(Continued)

(56) References Cited

U.S. PATENT DOCUMENTS 10,958,321 B2 * 3/2021 Park .................... H04W 72/042
2019/0182001 A1 * 6/2019 Lee .................... H04W 72/0473
(Continued)

FOREIGN PATENT DOCUMENTS

JP 2017532859 A 11/2017

OTHER PUBLICATIONS

3GPP TS 38.211 V15.2.0 "3rd Generation Partnership Project; Technical Specification Group Radio Access Network; NR; Physical channels and modulation (Release 15)" Jun. 2018 (96 pages).
(Continued)

*Primary Examiner* — Siu M Lee
(74) *Attorney, Agent, or Firm* — Osha Bergman Watanabe & Burton LLP (57) ABSTRACT

A user terminal includes: a transmission section including a plurality of antennas; and a control section that controls the phase of a signal transmitted from the plurality of antennas to a base station. The control section performs control such that any one of first information and second information is notified to the base station, the first information is information indicating any of a plurality of array patterns that are adoptable by each antenna in a case where the plurality of antennas are all coherent, and the second information is information indicating the number of the coherent antennas in a case where at least two of the plurality of antennas are coherent.

7 Claims, 7 Drawing Sheets

(51) Int. Cl.
*H04B 7/0456* (2017.01)
*H04W 16/28* (2009.01)

(58) Field of Classification Search
CPC .. H04B 7/0417; H04B 7/0421; H04B 7/0456; H04B 7/0469; H04B 7/0478; H04B 7/0482; H04B 7/0686; H04B 7/10; H04W 16/28
See application file for complete search history.

(56) References Cited

U.S. PATENT DOCUMENTS

| | | | | |
|---|---|---|---|---|
| 2019/0394733 | A1* | 12/2019 | Yang | H04B 7/0628 |
| 2020/0162133 | A1* | 5/2020 | Harrison | H04W 52/248 |
| 2020/0412421 | A1* | 12/2020 | Jiang | H04B 7/0469 |
| 2020/0413433 | A1* | 12/2020 | Jiang | H04W 72/1289 |
| 2021/0143870 | A1* | 5/2021 | Faxér | H04B 7/0608 |
| 2022/0052807 | A1* | 2/2022 | Liu | H04L 5/0091 |

OTHER PUBLICATIONS

3GPP TSG RAN WG1 Meeting 90bis; R1-1717362 "Remaining Issues on Codebook Based UL Transmission" Intel Corporation; Prague, CZ; Oct. 9-13, 2017 (7 pages).
International Search Report issued in International Application No. PCT/JP2018/030000, dated Oct. 9, 2018 (5 pages).
Written Opinion issued in International Application No. PCT/JP2018/030000; Dated Oct. 9, 2018 (4 pages).

* cited by examiner

Table 6.3.1.5-2: Precoding matrix W for single-layer transmission using four antenna ports with transform precoding enabled.

| TPMI index | W (ordered from left to right in increasing order of TPMI index) | | | | | | | |
|---|---|---|---|---|---|---|---|---|
| 0 – 7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8 – 15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\-1\end{bmatrix}$ | $\frac{1}{2}\begin{bmatrix}1\\j\\1\\j\end{bmatrix}$ | $\frac{1}{2}\begin{bmatrix}1\\-1\\1\\-1\end{bmatrix}$ | $\frac{1}{2}\begin{bmatrix}1\\-j\\1\\-j\end{bmatrix}$ |
| 16 – 23 | $\frac{1}{2}\begin{bmatrix}1\\1\\j\\j\end{bmatrix}$ | $\frac{1}{2}\begin{bmatrix}1\\j\\j\\1\end{bmatrix}$ | $\frac{1}{2}\begin{bmatrix}1\\-1\\j\\-j\end{bmatrix}$ | $\frac{1}{2}\begin{bmatrix}1\\-j\\j\\-1\end{bmatrix}$ | $\frac{1}{2}\begin{bmatrix}1\\-1\\-1\\1\end{bmatrix}$ | $\frac{1}{2}\begin{bmatrix}1\\-j\\-1\\j\end{bmatrix}$ | $\frac{1}{2}\begin{bmatrix}1\\1\\-1\\-1\end{bmatrix}$ | $\frac{1}{2}\begin{bmatrix}1\\j\\-1\\-j\end{bmatrix}$ |
| 24 – 27 | $\frac{1}{2}\begin{bmatrix}1\\-j\\-1\\j\end{bmatrix}$ | $\frac{1}{2}\begin{bmatrix}1\\1\\-j\\-j\end{bmatrix}$ | $\frac{1}{2}\begin{bmatrix}1\\-j\\-j\\-1\end{bmatrix}$ | $\frac{1}{2}\begin{bmatrix}1\\-j\\-j\\j\end{bmatrix}$ | – | – | – | – |

Non-coherent

Partial-/Non-coherent

Full-/Partial-/Non-coherent

USER EQUIPMENT AND RADIO COMMUNICATION METHOD

TECHNICAL FIELD

The present invention relates to a user terminal and a radio communication method.

BACKGROUND ART

Long Term Evolution (LTE) has been specified for achieving a higher data rate, lower latency, and the like in a Universal Mobile Telecommunications System (UMTS) network. Successor systems of LTE have also been studied for achieving a broader bandwidth and a higher speed based on LTE. Examples of successor systems of LTE include the systems called LTE-Advanced (LTE-A), Future Radio Access (FRA), 5th generation mobile communication system (5G), 5G plus (5G+), Radio Access Technology (New-RAT), New Radio (NR) and the like.

Currently, it is defined that user terminals transmit and receive signals using two or four antennas (NPL 1).

CITATION LIST

Non-Patent Literature

NPL 1
3GPP TS38.211 V15.2.0 "3rd Generation Partnership Project; Technical Specification Group Radio Access Network; NR; Physical channels and modulation (Release 15)", June 2018

SUMMARY OF INVENTION

Technical Problem

In future radio communication systems (for example, 5G), a user terminal possibly transmits and receives signals using four or more antennas. An increase in the number of antennas leads to an increase in variations in antenna configuration. However, it is difficult to improve the transmission quality between a user terminal and a base station if sharing of the information on the antenna configuration considering the variations is insufficient between the user terminal and the base station.

An object of one embodiment of the present disclosure is to provide a user terminal and a radio communication method that allow information on antenna configurations to be shared appropriately between a user terminal and a base station.

Solution to Problem

A user terminal according to one aspect of the present disclosure includes: a transmission section including a plurality of antennas; and a control section that controls a phase of a signal transmitted from the plurality of antennas to a base station, in which the control section performs control such that any one of first information and second information is notified to the base station, in which the first information is information indicating any of a plurality of array patterns adoptable by each of the antennas in a case where the plurality of antennas are all coherent, and the second information is information indicating the number of antennas that are coherent in a case where at least two of the plurality of antennas are coherent.

Advantageous Effects of Invention

According to the present disclosure, information on an antenna configuration can be appropriately shared between a user terminal and a base station.

BRIEF DESCRIPTION OF DRAWINGS

FIG. 4 is a diagram for explaining a relationship between coherency and a codebook in the case where a user terminal according to the embodiment of the present invention includes four antennas;

DESCRIPTION OF EMBODIMENTS

An embodiment of the present disclosure will be described below with reference to the accompanying drawings.

One Embodiment

<Configuration of User Terminal>

Figure 1:
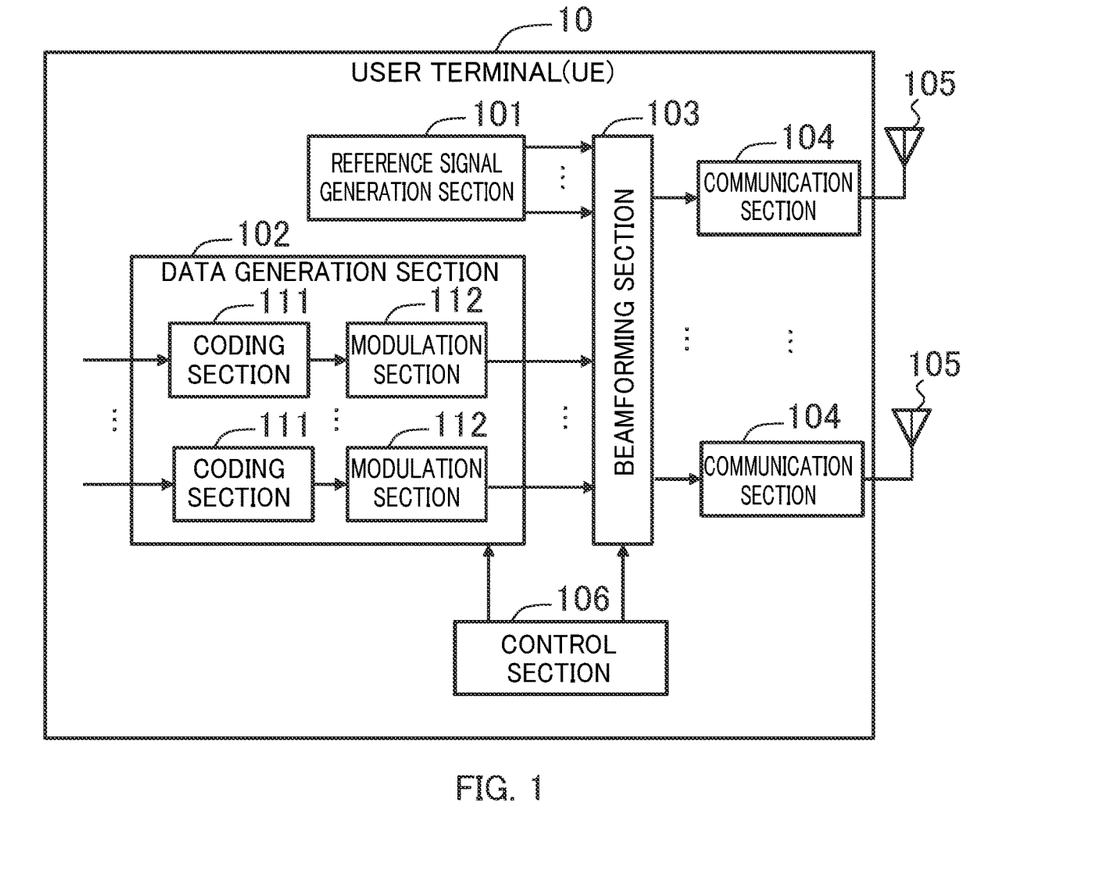
FIG. 1 illustrates an exemplary configuration of a user terminal according to one embodiment of the present invention.

The configuration of the user terminal according to this embodiment will be described with reference to FIG. 1. As shown in FIG. 1, user terminal 10 includes reference signal generation section 101, data generation section 102, beamforming section 103, communication section 104, antenna 105, and control section 106.

Note that FIG. 1 omits, for example, the components (for example, an Inverse Fast Fourier Transform (IFFT) processing section and a Cyclic Prefix (CP) addition section) for generating Orthogonal Frequency Division Multiplexing (OFDM) signals in user terminal 10. Besides, the signal waveform of the signal transmitted from user terminal 10 is not limited to the waveform based on OFDM modulation.

Reference signal generation section 101 generates a Reference Signal (RS)) used for channel estimation, and outputs it to beamforming section 103.

Data generation section 102 generates a data signal directed at a base station. Data generation section 102 includes coding section 111 and modulation section 112. The numbers of coding sections 111 and modulation sections 112 provided each depends on the number of streams ($M_j$) of signals transmitted to the base station. Each coding section 111 encodes the data signals of $M_j$ streams, and each modulation section 112 modulates the encoded data signals, and outputs the modulated data signals to beamforming section 103. Note that the coding rate and/or modulation method related to each coding section 111 and each modulation section 112 may differ among streams.

Beamforming section 103 multiplies the data signal input from data generation section 102 by, for example, a precoding matrix corresponding to the codebook, and outputs a beamforming (BF) data signal ($N_T$ signals) to communication section 104.

Communication sections 104 are provided for respective $N_T$ antennas 105 (antenna devices). Communication section 104 performs transmission processing such as Digital-to-Analog (D/A) conversion, up conversion, and the like on input signals, and multiplexes each signal that has been subject to the transmission processing by, for example, a time, frequency, or code, and transmits them from the respective $N_T$ antennas 105. To be specific, at the time of data transmission, communication section 104 transmits the signal of the stream, which is input from beamforming section 103, to the base station via antenna 105 (that is, transmits an uplink (UL) signal). Note that communication section 104 may be called a transmission section.

Control section 106 controls data generation section 102. Further, control section 106 controls beamforming section 103 to control the BF of the UL signal. Note that, the operation of the user terminal in the following description may be an operation achieved by the control by control section 106. In the following description, user terminal may be expressed as User Equipment (UE), and a base station may be expressed as gNodeB (gNB).

<Analysis>

Figure 2:
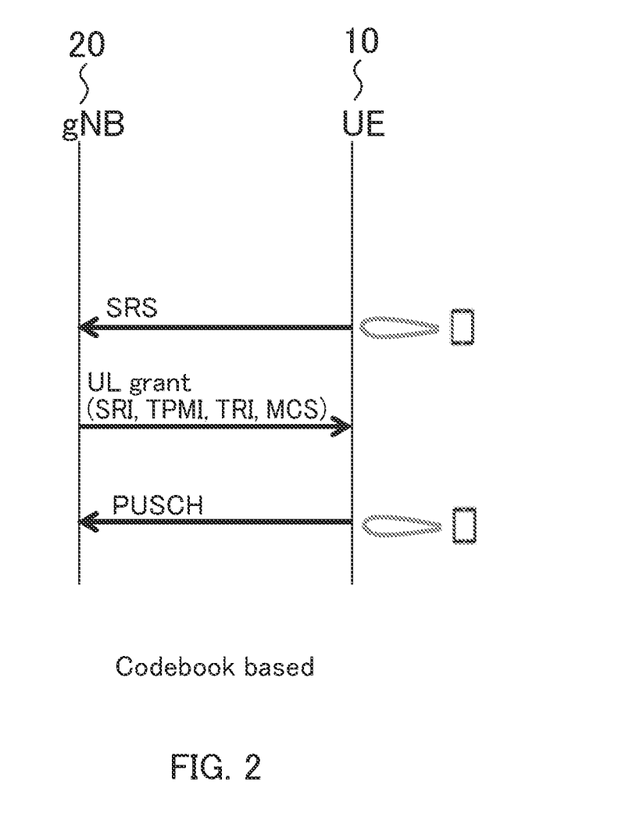
FIG. 2 illustrates an example of communication processing based on a codebook for a base station and a user terminal according to the embodiment of the present invention.

With reference to FIG. 2, a procedure in which UE 10 provided with two or four antennas performs BF for UL signal transmission, based on a codebook will be explained.

UE 10 transmits a Sounding Reference Signal (SRS) to gNB 20. Subsequently, gNB 20 determines the resource allocation of UE 10 according to the received SRS, and notifies UE 10 of a UL grant. To be specific, gNB 20 notifies UE 10 of, for example, a Scheduling Request Indicator (SRI), a Transmitted Precoding Matrix Indicator (TPMI), a Transmitted Rank Indicator (TRI), and a Modulation and Coding Scheme (MCS). UE 10 transmits the UL signal that has been subject to BF to gNB 20 through a Physical Uplink Shared Channel (PUSCH) of a UE grant. Here, UE 10 performs BF based on the codebook indicated by TPMI that has been notified by gNB 20.

The coherency observed in the case where UE 10 has two or four antennas will be described with reference to FIG. 3.

Figure 3:
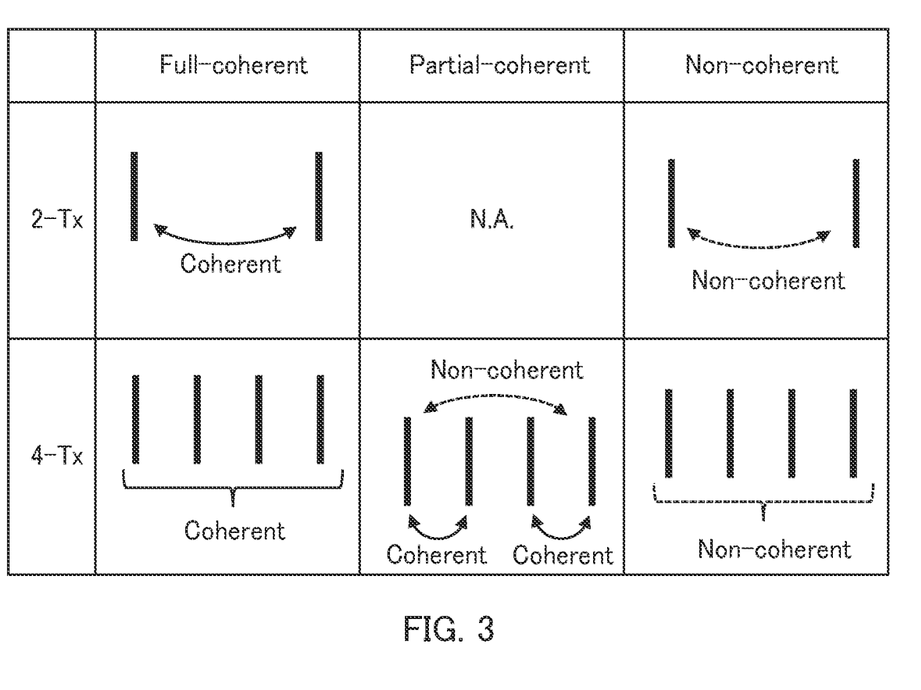
FIG. 3 illustrates a coherency pattern in the case where a user terminal according to one embodiment of the present invention has two or four antennas.
Figure 5:
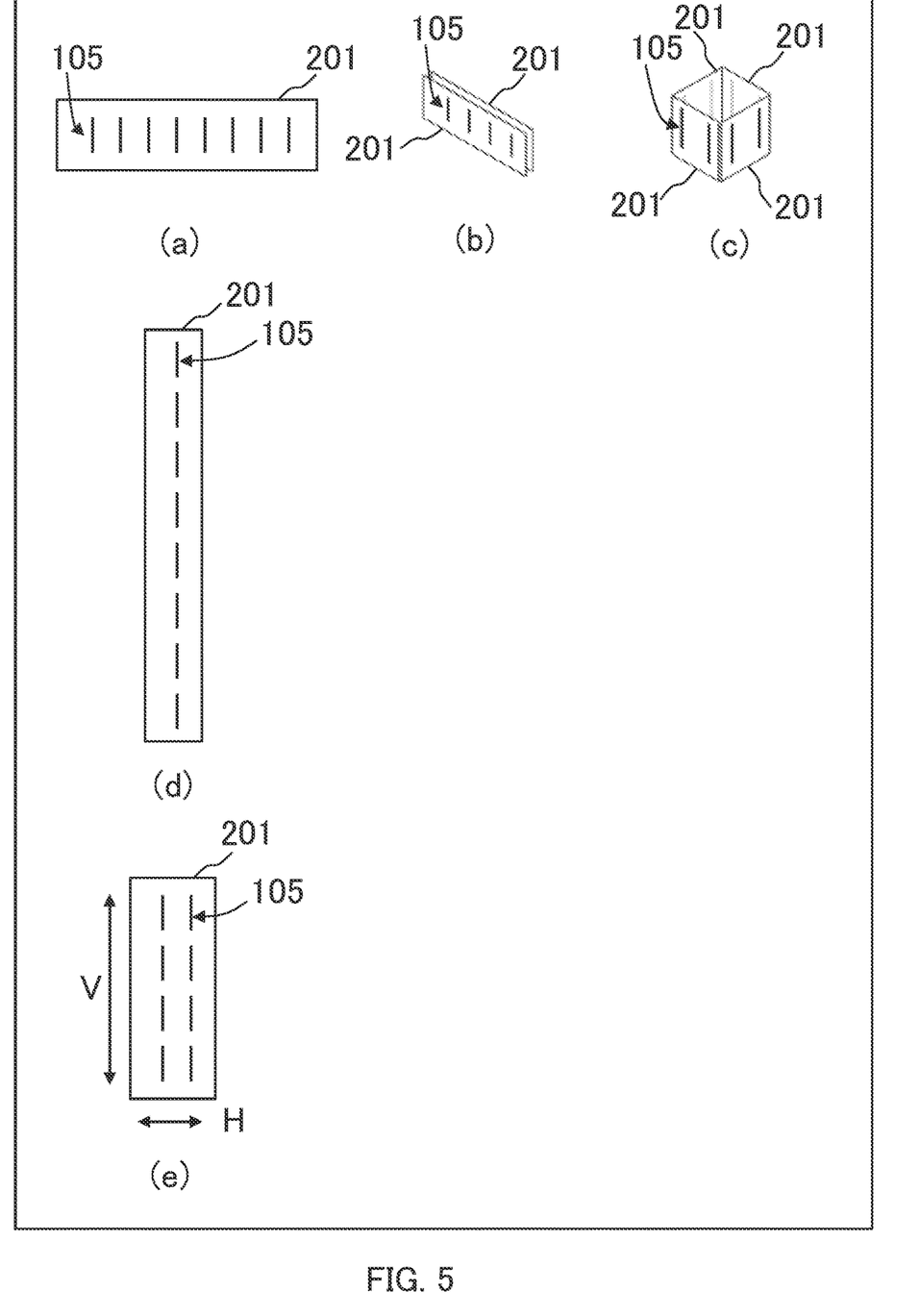
FIGS. 5A to 5E illustrate an example of a pattern of an antenna configuration in the case where a user terminal according to the embodiment of the present invention transmits single polarization.

As shown in "2-Tx" in FIG. 3, with two antennas, there are two cases: a full-coherent case in which the phase of the signal is controlled using two antennas as one set, and a non-coherent case in which the phase of the signal between the two antennas is not controlled.

As shown in "4-Tx" in FIG. 3, with four antennas, there are three cases: a full-coherent case in which the phase of the signal is controlled using four antennas as one set, a partial-coherent case in which the phase of the signal is controlled using two antennas as one set and the phase of the signal between the two sets is not controlled, and a non-coherent case in which the phase of the signal among the four antennas is not controlled.

As shown in FIG. 4, with four antennas, different codebooks (precoding matrices) are defined for the three cases: the full-coherent, partial-coherent, and non-coherent cases.

In other words, as shown in FIG. 4, a codebook used when UE 10 supports only the non-coherent case, a codebook used when UE 10 supports partial-coherent and non-coherent cases, and a codebook used when UE 10 supports full-coherent, partial-coherent, and non-coherent cases.

The codebook used by UE 10 may be determined based on the capability of UE as described below. In other words, UE 10 reports information on the antenna configuration shown in FIG. 3 to gNB 20 by using a UE capability in the NR criteria (Release 15). The information on the reported antenna configuration indicates, for example, whether the antenna configuration is full-coherent, partial-coherent, or non-coherent. Subsequently, gNB 20 selects a codebook to be used for UL transmission by UE 10 from the codebooks shown in FIG. 4 according to the UE capability. If the four antennas of UE 10 are in the full-coherent configuration, capability information that indicates the fact that UE 10 supports codebooks in the full-coherent, partial-coherent, and non-coherent cases may be reported. If the four antennas of UE 10 are in the partial-coherent configuration, capability information that indicates the fact that UE 10 supports codebooks in the partial-coherent and non-coherent cases may be reported. If the four antennas of UE 10 are in the non-coherent configuration, capability information that indicates the fact that UE 10 supports codebooks in the non-coherent case may be reported.

<UE with Eight Antennas>

The case where UE 10 has two or four antennas has been described above. However, in the case where UE 10 includes a large number of (for example, five or more) antennas, in order to achieve an improvement in UL signal transmission quality, the existing information which is notified to gNB 20 in the case where four antennas are used is not enough to be the information on the antenna configuration. For example, in the case where UE 10 includes a large number of (for example, five or more) antennas, the number of panels (antenna panels) on which the antennas are to be disposed, the number of antennas per panel, and the number of patterns of positional relationship between the panels is larger than in the case where four antennas are used. For this reason, with a large number of (for example, five or more) antennas, the number of patterns of partial-coherent antenna configuration is larger than in the case where four antennas are used. In such a case, reporting the capability information indicating the partial-coherent case as in the case where four antennas are used is not enough to provide sufficient information on the antenna configuration, and gNB 20 cannot select an appropriate codebook (precoding matrix). Although the antennas on the same panel are regarded as coherent and the antennas on different panels are regarded as non-coherent for convenience in the description below of this embodiment, the premise related to antennas and/or coherency does not necessarily have such restrictions, and the coherency and the antenna configuration can be regarded as independent of each other.

Accordingly, in this embodiment, information on the antenna configuration will be described taking the case where UE 10 includes eight antennas as an example.

In the case where the number of antennas transmitting the UL signal from UE 10 is expanded to eight (or more), as illustrated in FIGS. 5A to 5E or FIGS. 6A to 6E, the number of patterns of antenna configuration is larger than in the case where four antennas are used. To be specific, in the case where UE 10 includes eight or more antennas, the antenna configuration may take multiple patterns related to the following (A1), (A2), and (A3).

(A1) Pattern Related to Coherency and/or Panel Configuration

In the case where four antennas are used, as shown in FIG. 3, there is one partial-coherent pattern. On the other hand, in the case where eight antennas are used, as illustrated in FIGS. 5B and 5C or FIGS. 6B and 6C, the partial-coherent configuration may also take two or more patterns. In other words, in the case where eight antennas are used, there are more potential variations of panel configuration than in the case where four antennas are used, so that there are a larger number of patterns of partial-coherent configuration.

(A2) Antenna Array Pattern

With the use of up to four antennas, if one cross polarization is achieved using two single polarization antennas, the cross polarization antennas are arranged in a one-dimensional array (not a two-dimensional array). On the other hand, in the case where eight antennas are used, as illustrated in FIG. 6E, the two antennas achieving cross polarization can be arranged in a two-dimensional array. In other words, in the case where eight antennas are used, there are more antenna array patterns than in the case where four antennas are used.

(A3) Polarization Pattern

Figure 6:
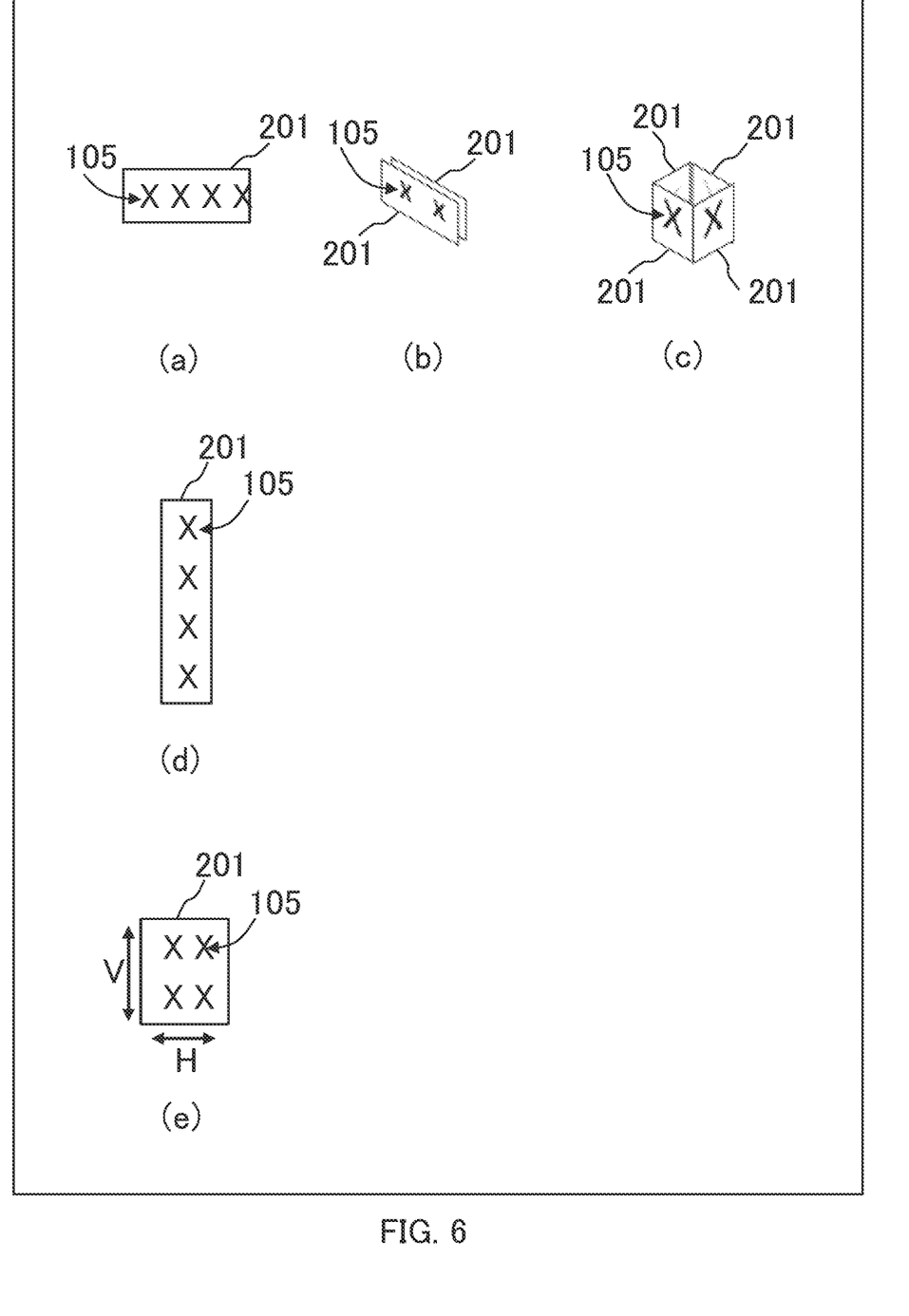
FIGS. 6A to 6E illustrate an example of a pattern of an antenna configuration in the case where a user terminal according to the embodiment of the present invention transmits cross polarization.

In the case where eight antennas are used, a pattern in which single polarization is achieved by arrangement on the single antenna basis as illustrated in FIGS. 5A to 5E, or a pattern in which cross polarization is achieved on the double antennas basis as illustrated in FIG. 6 can be used. In other words, in the case where eight antennas are used, there are more polarization patterns than in the case where four antennas are used.

To deal with various patterns described above, this embodiment employs the following method (B1) and/or (B2).

(B1) A method in which UE 10 notifies gNB 20 of information on an antenna configuration used to transmit a UL signal.

(B2) A method of configuring a configuration (for example, a codebook) according to the antenna configuration used by UE 10 to transmit a UL signal in gNB 20.

The method of (B1) may include a method of notifying a partial-coherent pattern (for example, (C1) and (C2) described later) and a method of notifying information on an antenna configuration regardless of whether it is partial-coherent or not (for example, (E1) to (E4) described later). The method of (B2) may include a method of configuring a configuration (for example, a codebook) according to the partial-coherent pattern (for example, (D1) and (D2) described later) and a method of notifying information on an antenna configuration (for example, (F1) to (F4) described later).

<Notification of Partial-Coherent Antenna Configuration Pattern>

As described above, when UE 10 includes eight antennas, as illustrated in FIGS. 5B and 5C or FIGS. 6B and 6C, two patterns of antenna configuration are available in the partial-coherent case. Note that, in the partial-coherent case, the inside of panel 201 may be coherent, and the space between panels 201 may be non-coherent. The arrangements of panels 201 shown in FIGS. 5B and 5C and FIGS. 6B and 6C are used for convenience for easy understanding of coherent and non-coherent cases. In other words, FIGS. 5 and 6 do not indicate the fact that UE 10 includes panels 201 with the arrangements shown in the drawings.

FIG. 5B shows an antenna configuration having two panels 201 and four antennas 105 disposed on each panel 201. In the antenna configuration of FIG. 5B, the number of coherent antennas is four at most among eight antennas. FIG. 5C shows an antenna configuration having four panels 201 and two antennas 105 disposed on each panel 201. In the antenna configuration of FIG. 5C, the number of coherent antennas is two at most among eight antennas.

FIG. 6B shows an antenna configuration having two panels 201 and two cross polarization antennas 105 disposed on each panel 201. In the antenna configuration of FIG. 6B, the number of coherent antennas is four at most among eight antennas (two cross polarization antennas are coherent among four cross polarization antennas). FIG. 6C shows an antenna configuration having four panels 201 and one cross polarization antenna 105 disposed on each panel 201. In the antenna configuration of FIG. 6C, the number of coherent antennas is two at most among eight antennas.

As described above, in the case where eight antennas are used, as shown by a comparison between FIGS. 5B and 5C and a comparison between FIGS. 6B and 6C, even in the partial-coherent case with the same polarization (single polarization or cross polarization), there may be patterns among which the number of antennas per panel (or the maximum number of coherent antennas) differs. In the case where eight antennas are used, as shown by a comparison between FIGS. 5B and 6B and a comparison between FIGS. 5C and 6C, even in the partial-coherent case with the same number of antennas per panel (or the maximum number of coherent antennas), there may be patterns among which the polarization differs.

To address this, UE 10 notifies gNB 20 of the pattern of the antenna configuration of UE 10 in the partial-coherent case. For example, notification is made by the methods (C1) and/or (C2) below.

(C1) Two patterns of partial-coherent antenna configuration are associated with type 1 and type 2, respectively, and UE 10 notifies gNB 20 of information indicating type 1 or type 2.

(C2) Two patterns of partial-coherent antenna configuration are associated with partial-coherent type 1 and partial-coherent type 2, respectively, and UE 10 notifies gNB of information indicating any one of the following: full-coherent, partial-coherent type 1, partial-coherent type 2, and non-coherent.

In (C2), when UE 10 is supposed to report to gNB 20 that it supports the partial-coherent case by using a UE capability in the NR criteria (Release 15), for example, the assumption of a partial-coherent pattern of UE 10 (for example, the assumption of type 1 or 2) may be reported to gNB 20 by using another UE capability different from the UE capability for reporting the partial-coherent case. In the case where UE 10 reports the partial-coherent case to gNB 20 by using a UE capability in the NR criteria (Release 15) and does not report to gNB 20 about the assumption of a partial-coherent pattern (for example, the assumption of type 1 or 2), gNB 20 may configure a codebook (or UL beam management) assuming that this UE 10 has reported it type 1 (or type 2).

Further, in (C2), UE 10 may report to gNB 20 about whether it supports one or more of the full-coherent, partial-coherent, and non-coherent cases, and the assumption of a partial-coherent pattern of UE 10 (for example, type 1 or 2) by using one UE capability in the NR criteria (Release 16).

Further, in (C2), UE 10 may notify to gNB 20 about differences between polarization configurations. For example, two patterns of single-polarization partial-coherent antenna configuration (for example, FIGS. 5B and 5C) may be associated with type 1 and type 2, and two patterns of cross-polarization partial-coherent antenna configuration (for example, FIGS. 6B and 6C) may be associated with type 3 and type 4. UE 10 may notify gNB 20 of information indicating any one of types 1 to 4. Alternatively, UE 10 may notify gNB 20 of polarization configurations separately (independently).

This embodiment describes partial-coherent patterns of antenna configuration with eight antennas. However, this embodiment is applicable to the case where there are more than eight antennas, according to the same concept.

Further, although this embodiment has shown an example in which there are two patterns of partial-coherent antenna configuration, there may be three or more patterns of partial-coherent antenna configuration. For example, for a partial-coherent antenna configuration with 16 antennas, at least four patterns may be assumed: the configuration in which there are two panels and six antennas are arranged in each panel, the configuration in which there are three panels and four antennas are arranged in each panel, the configuration in which there are four panels and three antennas are arranged in each panel, and the configuration in which there are six panels and two antennas are arranged in each panel.

<Codebook Determination>

The appropriate codebook may differ between different patterns of partial-coherent antenna configurations. For example, as described above, FIGS. 5B and 5C are both patterns of partial-coherent antenna configuration. In the antenna configuration shown in FIG. 5B, the number of coherent antennas is at most four out of the eight antennas, and in the antenna configuration shown in FIG. 5C, the number of coherent antennas is two out of the eight antennas. Accordingly, the antenna configuration shown in FIG. 5B is assumed to support a codebook in which two antennas are coherent out of the eight antennas, a codebook in which three antennas are coherent out of the eight antennas, and a codebook in which four antennas are coherent out of the eight antennas. On the other hand, the antenna configuration shown in FIG. 5C is assumed to support a codebook in which two antennas are coherent out of the eight antennas and not support a codebook in which more than two antennas are coherent out of the eight antennas.

Thus, UE 10 and gNB 20 switch the codebook based on the partial-coherent antenna configuration pattern, for example, by the following method (D1) and/or (D2).

(D1) Different codebooks are associated according to the coherency type. In this case, gNB 20 may switch the codebook configuration according to the coherency type notified from UE 10.

(D2) gNB 20 changes the content of downlink signaling Downlink Control Information (DCI) according to the coherency type notified from UE 10. In this case, UE may assume a codebook configuration based on the received DCI (NR criteria (Release 15)). For example, gNB 20 may notify UE 10 of information on a change in the content of DCI. Note that gNB 20 may notify the configuration of that codebook to UE 10 as a subset of the existing codebook.

When UE 10 reports to gNB 20 about a coherency type through UE capability signaling, it may be assumed that the codebook (or UL beam management) configured from gNB 20 is necessarily of the coherency type reported to this gNB 20.

In (C1) and (C2) above, methods have been explained in which UE 10 notifies the pattern of the antenna configuration to gNB 20 in the partial-coherent case. A method in which UE 10 notifies information on an antenna configuration to gNB 20 regardless of whether or not it has a partial-coherent antenna configuration will now be explained.

<Notification of Information on Antenna Configuration>

UE 10 may notify gNB 20 of information on the antenna configuration of this UE 10 by at least one method of the following (E1) to (E4).

(E1) UE 10 may notify an antenna array to gNB 20 by using two natural numbers V and H. For example, in the case where UE 10 includes the antenna array illustrated in FIG. 5E, it may notify gNB 20 of the fact that V=4 and H=2. For example, in the case where UE 10 includes the antenna array illustrated in FIG. 6E, UE 10 may notify gNB 20 of the fact that V=2 and H=2. The information on the antenna array is not necessarily expressed by V and H. For example, the information on the antenna array may be notified as the combination thereof in the form of an antenna array type or the like.

(E2) UE 10 may notify gNB 20 of information on a polarization configuration. The information on the polarization configuration may include at least one of the following: the type of the polarization configuration and the number of polarization planes. For example, UE 10 may notify gNB 20 of information on a polarization configuration indicating whether the type of the polarization configuration of antenna 105 is single polarization or cross polarization. Alternatively, UE 10 may notify gNB 20 of a numerical value, such as 1 or 2, as the number of polarization planes.

(E3) UE 10 may notify gNB 20 of the antenna configuration of each panel 201. In this case, gNB 20 may assume that multiple panels 201 have a common antenna configuration. For example, in the case where UE 10 has the antenna configuration illustrated in FIG. 5B, it may issue the notification that each panel 201 has four single-polarization antennas. For example, in the case where UE 10 has the antenna configuration illustrated in FIG. 5C, it may issue the notification that each panel 201 has two single-polarization antennas. For example, in the case where UE 10 has the antenna configuration illustrated in FIG. 6B, it may issue the notification that each panel 201 has four cross-polarization antennas (two sets of two antennas). For example, in the case where UE 10 has the antenna configuration illustrated in FIG. 6C, it may issue the notification that each panel 201 has two cross-polarization antennas (one set of two antennas).

(E4) UE 10 may notify gNB 20 of the antenna configuration of each panel 201. For example, in the case where UE 10 has the antenna configuration illustrated in FIG. 5B, it may issue the notification that first panel 201 has four single-polarization antennas, and second panel 201 has four single-polarization antennas. The same applies to FIG. 5C. Further, for example, in the case where UE 10 has the antenna configuration illustrated in FIG. 6B, it may issue the notification that first panel 201 has four cross-polarization antennas (two sets of two antennas), and second panel 201 has four cross-polarization antennas (two sets of two antennas). The same applies to FIG. 6C.

Note that the antenna configuration may be notified by any one of (C1), (C2), and (E1) to (E4) above, or a combination of two or more of them.

In addition, gNB 20 may switch the codebook configuration according to at least one of the following (F1) and (F2).

(F1) gNB 20 switches the codebook configuration according to the two natural numbers V and H notified from UE 10. For example, UE 10 may notify gNB 20 of the antenna configuration in each dimension as codebookConfig N1, codebookConfig N2, or the like.

(F2) gNB 20 switches the codebook configuration according to the polarization configuration notified from UE 10. For example, gNB 20 switches the codebook configuration according to whether the polarization configuration is of the single polarization type or cross polarization type. Alternatively, gNB 20 switches the codebook configuration according to the number of polarization planes notified from UE 10.

Note that the configuration may be switched by any one of the methods (D1), (D2), (F1), and (F2), or a combination of two or more of them.

Note that the antenna configuration of UE 10 may be notified to gNB 20 implicitly with any elements other than those described above. For example, in the above, UE capability signaling used to notify the antenna configuration (and/or the number of antennas) of UE 10 may be assumed from the maximum number of layers and/or the number of Demodulation Reference Signal (DM-RS) ports, or the number of SRS ports.

<Note>

This embodiment is applicable regardless of the distinction between uplink and downlink, and transmission and reception. In this case, the uplink signal (or channel) and the downlink signal (or channel) can be read interchangeably. In addition, uplink feedback information and downlink control signaling can be read interchangeably.

Although this embodiment has been described as using mainly the New Radio (NR) channel and signaling scheme, this embodiment is applicable to channels and signaling schemes having the same function as the NR ones. For example, this embodiment is also applicable to LTE/LTE-A.

Signaling illustrated in this embodiment is not limited to the explicit method, and may be notified implicitly or may be uniquely defined in the specification.

Moreover, the signaling illustrated in this embodiment is not limited to that illustration. For example, it may be signaling using different layers, such as Radio Resource Control (RRC), Medium Access Control (MAC) Control Element (CE), or DCI, or signaling using Master Information Block (MIB), System Information Block (SIB), or the like. Alternatively, it may be signaling in which RRC and DCI are combined, signaling in which RRC and MAC CE are combined, or signaling in which RRC, MAC CE, and DCI are all combined.

Whether the physical signal and/or channel is beamformed or not, which is expressed using a beam, BF, RS, or the like in this embodiment, may be transparent from the base station and/or terminal. In other words, the beam, BF, RS, or the like can be rephrased as signal, RS, and the like. In addition, an RS being beamformed may be rephrased as an RS resource. Similarly, beam selection may be rephrased as resource selection. In addition, a beam index may be rephrased as a resource index, an antenna port index, or the like.

For panel 201, which is an expression used for convenience in this embodiment, other expressions may be used. For example, panel 201 may be represented by antenna, antenna panel, antenna group, beam, spatial filter, RS resource, Quasi-collocation (QCL), or Transmission Configuration Indicator (TCI). Alternatively, a panel may be represented using the concept in which they are grouped. Antenna 105 may be rephrased as, for example, port, antenna port, SRS port, or antenna device.

This embodiment is also applicable as Channel State Information (CSI) measurement, channel sounding, beam management, and the like. Further, this embodiment is also applicable to link control such as other beam control.

Resource Blocks (RBs) and subcarriers in this embodiment can be replaced with each other. Similarly, slots and symbols in this embodiment can be replaced with each other.

The embodiments and modifications described above can be combined with one another. In addition, the illustrated features can be combined with one another. In addition, the specific combinations of features illustrated in the specification are not necessarily the case in the present invention.

This embodiment has described mainly the case where the number of antennas is eight, which is not necessarily the case in this embodiment. For example, this embodiment is applicable to the case where the number of antennas is 6, 12, 16, or other numbers.

Summary of this Embodiment

User terminal 10 according to this embodiment includes: communication section (transmission section) 104 having multiple antennas 105: and control section 106 that controls the phase of the signal transmitted from multiple antennas 105 to base station 20. Control section 106 performs control so that base station 20 is notified of the first information or the second information. The first information is information indicating any of the multiple array patterns that can be taken by each antenna 105 in the case where the multiple antennas 105 are all coherent. The second information is information indicating the number of antennas 105 that are coherent in the case where at least two of the multiple antennas 105 are coherent.

With this configuration, base station 20 can recognize the configurations of multiple antennas 105 (for example, eight antennas) included in user terminal 10 based on the first information or the second information (that is, information on the antenna configuration) notified from user terminal 10, and a codebook suitable for the antenna configuration can be notified to user terminal 10. This improves the transmission quality of the UL signal between user terminal 10 and base station 20.

The embodiment of the present disclosure has been described above.

<Hardware Configuration>

Note that the block diagrams used to describe the embodiments illustrate blocks on the basis of functions. These functional blocks (constituent sections) are implemented by any combination of hardware and/or software. A means for implementing the functional blocks is not particularly limited. That is, the functional blocks may be implemented by one physically and/or logically coupled apparatus. Two or more physically and/or logically separated apparatuses may be directly and/or indirectly (for example, via wires and/or wirelessly) connected, and the plurality of apparatuses may implement the functional blocks.

Figure 7:
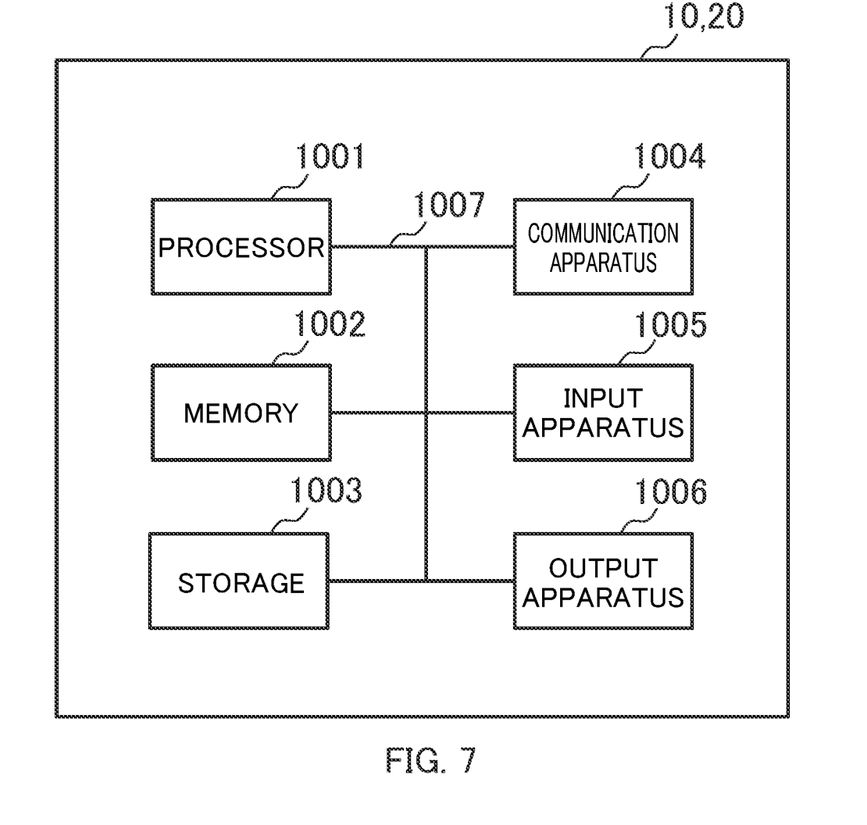
FIG. 7 illustrates an example of a hardware configuration of a user terminal and a base station according to the embodiment of the present invention.

For example, user terminal 10, base station 20, and the like according to an embodiment of the present invention may function as a computer that executes processing of a radio communication method of the present invention. FIG. 7 illustrates an example of a hardware configuration of user terminal 10 and base station 20 according to an embodiment of the present invention. User terminal 10 and base station 20 as described above may be physically constituted as a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of user terminal 10 and of base station 20 may include one apparatus or a plurality of apparatuses illustrated in the drawings or may not include part of the apparatuses.

The functions in radio user terminal 10 and base station 20 are implemented by predetermined software (program) loaded into hardware, such as processor 1001, memory 1002, and the like, according to which processor 1001 performs the arithmetic and controls communication performed by communication apparatus 1004 or reading and/or writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and the like. For example, above-described reference signal generation section 101, data generation section 102, beamforming section 103, communication section 104, control section 106, and the like may be implemented using processor 1001.

Processor 1001 reads out a program (program code), a software module, or data from storage 1003 and/or communication apparatus 1004 to memory 1002 and executes various types of processing according to the read-out program or the like. The program used is a program for causing the computer to execute at least part of the operation described in the embodiments. For example, control section 106 may be implemented by a control program stored in memory 1002 and operated by processor 1001, and the other functional blocks may also be implemented in the same way. While it has been described that the various types of processing as described above are executed by one processor 1001, the various types of processing may be executed by two or more processors 1001 at the same time or in succession. Processor 1001 may be implemented by one or more chips. Note that the program may be transmitted from a network through a telecommunication line.

Memory 1002 is a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), or the like. Memory 1002 can save a program (program code), a software module, and the like that can be executed to carry out the radio communication method according to an embodiment of the present invention.

Storage 1003 is a computer-readable recording medium and may be composed of, for example, at least one of an optical disk such as a CD-ROM (Compact Disc ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, and a magnetic strip. Storage 1003 may also be called an auxiliary storage apparatus. The storage medium as described above may be a database, server, or other appropriate media including memory 1002 and/or storage 1003.

Communication apparatus 1004 is hardware (transmission and reception device) for communication between computers through a wired and/or radio network and is also called, for example, a network device, a network controller, a network card, or a communication module. For example, communication section 104 and the like as described above may be implemented by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which outputs to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or by buses different among the apparatuses.

Furthermore, user terminal 10 and base station 20 may include hardware, such as a microprocessor, a digital signal processor (DSP), an Application Specific Integrated Circuit (ASIC), a Programmable Logic Device (PLD), and a Field Programmable Gate Array (FPGA), and the hardware may implement part or all of the functional blocks. For example, processor 1001 may be implemented by at least one of these pieces of hardware.

<Notification and Signaling of Information>

The notification of information is not limited to the aspects or embodiments described in the present specification, and the information may be notified by another method. For example, the notification of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, or the like.

<Applicable System>

The aspects and embodiments described in the present specification may be applied to a system using LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system extended based on the above systems.

<Processing Procedure and the Like>

The orders of the processing procedures, the sequences, the flow charts, and the like of the aspects and embodiments described in the present specification may be changed as long as there is no contradiction. For example, elements of various steps are presented in exemplary orders in the methods described in the present specification, and the methods are not limited to the presented specific orders.

<Operations of Base Station>

Specific operations which are described in the specification as being performed by the base station may sometimes be performed by an upper node depending on the situation. Various operations performed for communication with a terminal in a network constituted by one network node or a plurality of network nodes including a base station can be obviously performed by the base station and/or a network node other than the base station (examples include, but not limited to, MME or S-GW). Although there is one network node in addition to the base station in the case illustrated above, a plurality of other network nodes may be combined (for example, MME and S-GW).

<Direction of Input and Output>

The information and the like (see paragraph<Information and Signals>) can be output from a higher layer (or a lower layer) to a lower layer (or a higher layer). The information, the signals, and the like may be input and output through a plurality of network nodes.

<Handling of Input and Output Information and the Like>

The input and output information and the like may be saved in a specific place (for example, memory) or may be managed by a management table. The input and output information and the like can be overwritten, updated, or additionally written. The output information and the like may be deleted. The input information and the like may be transmitted to another apparatus.

<Determination Method>

The determination may be made based on a value expressed by one bit (0 or 1), based on a Boolean value (true or false), or based on comparison with a numerical value (for example, comparison with a predetermined value).

<Variation or the like of Aspects>

Each aspect/embodiment described in the present specification may be used alone or in combination, and may be switched for use upon execution. In addition, notification of predetermined information (for example, the notification that "it is X") is not limited to explicit notification, and may be implicit notification (for example, not notifying the predetermined information).

Although the present invention has been described above in detail, it is apparent to those skilled in the art that the present invention is not limited to the embodiments described in the specification. The present invention can be implemented as modifications and variations without departing from the spirit and scope of the present invention defined by the description of the claims. Therefore, the description of this specification is aimed at illustration and does not have any restrictive meaning in relation to the present invention.

<Meaning and Interpretation of Terms>

<Software>

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, and the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a radio technique, such as an infrared ray, a radio wave, and a microwave, the wired technique and/or the radio technique is included in the definition of the transmission medium.

<Information and Signals>

The information, the signals, and the like described in the present specification may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, or the like.

<"System" and "Network">

The terms "system" and "network" used in the present specification can be interchangeably used.

<Names of Parameters and Channels>

The information, the parameters, and the like described in the present specification may be expressed by absolute values, by values relative to predetermined values, or by other corresponding information. For example, radio resources may be indicated by indices.

The names used for the parameters are not limited in any respect. Furthermore, the numerical formulas and the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

<Base Station>

The base station can accommodate one cell or a plurality of (for example, three) cells (also called sector). When the base station accommodates a plurality of cells, the entire coverage area of the base station can be divided into a plurality of smaller areas, and each of the smaller areas can provide a communication service based on a base station subsystem (for example, small base station for indoor, remote radio head (RRH)). The term "cell" or "sector" denotes part or all of the coverage area of the base station and/or of the base station subsystem that perform the communication service in the coverage. Furthermore, the terms "base station," "eNB," "cell," and "sector" can be interchangeably used in the present specification. The base station may be called a fixed station, a NodeB, an eNodeB (eNB), an access point, a femto cell, a small cell, or the like.

<Mobile Station>

The mobile station may be called, by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, or a client or by some other appropriate terms.

<Meaning and Interpretation of Terms>

As used herein, the term "determining" may encompass a wide variety of actions. For example, "determining" may be regarded as judging, calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing and the like. That is, "determining" may be regarded as a certain type of action related to determining.

<"Connected" and "Coupled">

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When the terms are used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limiting and non-inclusive examples.

<Reference Signal>

The reference signal can also be abbreviated as RS and may also be called a pilot depending on the applied standard.

<Meaning of "Based On">

The description "based on" used in the present specification does not mean "based only on," unless otherwise specifically stated. In other words, the description "based on" means both of "based only on" and "based at least on."

<"First" and "Second">

Any reference to an element using the designation "first", "second", or the like used in the present specification does not generally limit the quantity or order of these elements. These designations may be used in the present specification as a convenient way of distinguishing between two or more elements. Thus, reference to the first and second elements does not mean that only two elements can be taken there, or that in any way the first element must precede the second element.

<Means>

The "means" in the configuration of each apparatus may be replaced with "section," "circuit," "device," or the like.

<Open Form>

The terms "including," "comprising," and modifications of these terms are intended to be inclusive just like the term "having," as long as the terms are used in the present specification or the appended claims. Furthermore, the term "or" used in the present specification or the appended claims is not intended to be an exclusive or.

<Time Unit of TTI and the Like, and Radio Frame Configuration>

The radio frame may be constituted by one frame or a plurality of frames in the time domain. The one frame or each of the plurality of frames may be called a subframe in the time domain. The subframe may be further constituted by one slot or a plurality of slots in the time domain. The slot may be further constituted by one symbol or a plurality of symbols (OFDM symbol, SC-FDMA symbol, or the like) in the time domain. The radio frame, the subframe, the slot, and the symbol indicate time units in transmitting signals. The radio frame, the subframe, the slot, and the symbol may be called by other corresponding names. For example, in the LTE system, the base station creates a schedule for assigning radio resources to each mobile station (such as frequency bandwidth that can be used by each mobile station and transmission power). The minimum time unit of scheduling may be called a TTI (Transmission Time Interval). For example, one subframe, a plurality of continuous subframes, or one slot may be called a TTI. The resource block (RB) is a resource assignment unit in the time domain and the frequency domain, and the resource unit may include one subcarrier or a plurality of continuous subcarriers in the frequency domain. In addition, the resource block may include one symbol or a plurality of symbols in the time domain, and may have a length of one slot, one subframe, or one TTI. One TTI and one subframe may be constituted by one resource block or a plurality of resourceblocks. The structure of the radio frame is illustrative only, and the number of subframes included in the radio frame, the number of slots included in the subframe, the numbers of symbols and resource blocks included in the slot, and the number of subcarriers included in the resource block can be changed in various ways.

<Maximum Transmission Power>

"Maximum transmission power" described in this embodiment means the maximum value of transmission power, but may also mean, for example, the nominal UE maximum transmit power or the nominal UE maximum transmit power.

<Article>

When articles, such as "a," "an," and "the" in English, are added by translation in the entire disclosure, the articles include plural forms unless otherwise clearly indicated by the context.

INDUSTRIAL APPLICABILITY

One embodiment of the present disclosure is useful for radio communication systems.

REFERENCE SIGNS LIST

10 User terminal
20 Base station
101 Reference signal generation section
102 Data generation section
103 Beamforming section
104 Communication section
105 Antenna
106 Control section
111 Coding section
112 Modulation section

The invention claimed is:

1. A terminal, comprising:
a transmitter including a plurality of antennas; and
a processor that controls a phase of a signal transmitted from the plurality of antennas to a base station, wherein
the processor performs control such that any one of first information and second information is notified to the base station, wherein
the first information is information indicating any of a plurality of array patterns adoptable by each of the antennas in a case where the plurality of antennas are all coherent,
the second information is information indicating the number of antennas that are coherent in a case where at least two of the plurality of antennas are coherent and the plurality of antennas are partial-coherent,
the number of antennas differs in a partial-coherent case with the same polarization, and
a polarization of antennas differs in the partial-coherent case with the same number of antennas.

2. The terminal according to claim 1, wherein the processor performs control such that third information indicating a polarization configuration of the plurality of antennas is notified to the base station.

3. The terminal according to claim 1, wherein the processor controls a signal transmitted from the plurality of antennas to the base station, based on information configured by the base station according to the first information or the second information.

4. The terminal according to claim 1, wherein the number of the plurality of antennas is eight or more.

5. A radio communication method, comprising:
notifying, by a terminal including a plurality of antennas, to a base station of any one of first information and second information;

the first information being information indicating any of a plurality of array patterns adoptable by each of the antennas in a case where the plurality of antennas are all coherent, and the second information being information indicating the number of antennas that are coherent in a case where at least two of the plurality of antennas are coherent and the plurality of antennas are partial-coherent, wherein the number of antennas differs in a partial-coherent case with the same polarization, and a polarization of antennas differs in the partial-coherent case with the same number of antennas, determining, by the base station, a configuration to be used by the terminal to control an uplink signal, according to the first information or the second information, and controlling, by the terminal, the uplink signal based on the configuration determined by the base station.

6. The terminal according to claim 2, wherein the number of the plurality of antennas is eight or more.

7. The terminal according to claim 3, wherein the number of the plurality of antennas is eight or more.

* * * * *